United States Patent
Haupt et al.

(10) Patent No.: US 11,390,142 B2
(45) Date of Patent: Jul. 19, 2022

(54) METHOD OF DISTRIBUTING AIR VENTILATION IN A VEHICLE

(71) Applicant: Hanon Systems, Daejeon (KR)

(72) Inventors: Eric Haupt, Livonia, MI (US); Jayanthi R. Iyer, Northville, MI (US)

(73) Assignee: HANON SYSTEMS, Daejeon (KR)

( * ) Notice: Subject to any disclaimer, the term of this patent is extended or adjusted under 35 U.S.C. 154(b) by 96 days.

(21) Appl. No.: 16/393,341

(22) Filed: Apr. 24, 2019

(65) Prior Publication Data
US 2019/0248212 A1 Aug. 15, 2019

Related U.S. Application Data

(62) Division of application No. 15/293,833, filed on Oct. 14, 2016, now Pat. No. 10,315,494.

(51) Int. Cl.
| | | |
|---|---|---|
| *B60H 1/24* | (2006.01) | |
| *B60H 1/00* | (2006.01) | |
| *B60H 1/26* | (2006.01) | |
| *B60H 1/28* | (2006.01) | |
| *B60S 1/54* | (2006.01) | |
| *F25D 21/12* | (2006.01) | |

(52) U.S. Cl.
CPC ......... *B60H 1/247* (2013.01); *B60H 1/00021* (2013.01); *B60H 1/00671* (2013.01); *B60H 1/00685* (2013.01); *B60H 1/267* (2013.01); *B60H 1/28* (2013.01); *B60S 1/54* (2013.01); *F25D 21/125* (2013.01); *B60H 2001/00092* (2013.01); *B60H 2001/00714* (2013.01)

(58) Field of Classification Search
CPC .............. B60H 1/1247; B60H 1/00021; B60H 1/00671; B60H 1/00685; B60H 1/267; B60H 1/247; B60H 1/28; B60H 2001/0009; B60H 2001/0071; B60S 1/54; F25D 21/125
USPC ........................................................ 454/124
See application file for complete search history.

(56) References Cited

U.S. PATENT DOCUMENTS

| | | | | |
|---|---|---|---|---|
| 4,741,258 A | * | 5/1988 | Trube | B60H 1/242 454/127 |
| 5,564,979 A | | 10/1996 | Sumiya et al. | |

(Continued)

FOREIGN PATENT DOCUMENTS

| | | |
|---|---|---|
| JP | H10166838 A | 6/1998 |
| JP | H1191335 A | 4/1999 |

(Continued)

*Primary Examiner* — Allen R. B. Schult
(74) *Attorney, Agent, or Firm* — Shumaker, Loop & Kendrick, LLP; James D. Miller (57) ABSTRACT

An air handling system for a heating, ventilation, and air conditioning system of a motor vehicle includes a conduit configured to convey air from the air handling system to a vent of the air handling system. A control door is rotatably disposed in the conduit. The control door selectively rotates between a first position and a second position. The first position blocks passage of the air flowing through the conduit. The second position blocks passage of the air flowing through a first portion of the conduit and allows the air to flow through a second portion of the conduit. A control feature is disposed in the second portion of the conduit to control at least one of a volumetric flow rate and a pressure of the air flowing through the second portion.

17 Claims, 9 Drawing Sheets

(56) References Cited

U.S. PATENT DOCUMENTS

| | | | | |
|---|---|---|---|---|
| 8,511,371 B2* | 8/2013 | Onda | ................... | B60H 1/0005 |
| | | | | 165/202 |
| 2005/0118944 A1 | 6/2005 | Vincent et al. | | |
| 2010/0178861 A1* | 7/2010 | Sano | ................... | B60H 1/00028 |
| | | | | 454/127 |
| 2013/0288586 A1* | 10/2013 | Jang | ................... | B60H 1/00857 |
| | | | | 454/152 |

FOREIGN PATENT DOCUMENTS

| | | |
|---|---|---|
| JP | 2002274154 A | 9/2002 |
| JP | 2003326950 A | 11/2003 |

\* cited by examiner

METHOD OF DISTRIBUTING AIR VENTILATION IN A VEHICLE

CROSS-REFERENCE TO RELATED PATENT APPLICATION

This patent application is a divisional patent application of U.S. patent application Ser. No. 15/293,833 filed on Oct. 14, 2016, the entire disclosure of which is incorporated herein by reference.

FIELD OF THE INVENTION

The invention relates to a climate control system for a vehicle, and more particularly to a climate control system for a heating, ventilating, and air conditioning system for the vehicle.

BACKGROUND OF THE INVENTION

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air-handling system. The air-handling system conditions air flowing therethrough and distributes the conditioned air throughout the passenger compartment.

The air-handling system commonly employs a housing having a plurality of passageways and doors for controlling a temperature and a flow of the air therethrough. The housing may for example be divided into an inlet section, a conditioning section, a mixing section, and a delivery section. The inlet section may include a blower or fan for delivering the air to the conditioning section. The conditioning section includes one or more heat exchangers for controlling a temperature and humidity of the air. Control features disposed within the conditioning section control the flow of the air through passageways having the heat exchangers disposed therein. For example, temperature doors, or otherwise referred to as flaps or valves, can be employed to control the flow of the air through passageways having the heat exchangers disposed therein. The mixing section is disposed downstream of the conditioning section and forms a chamber for recombining each of the streams of air, whether heated or cooled, exiting the conditioning section. The delivery section includes a plurality of conduits or ducts branching from the mixing section for delivering the air to the desired vents located within the passenger compartment of the vehicle.

The vents disposed within the passenger compartment may include panel vents, console vents, front floor vents, rear floor vents, windshield defrost vents, and side window defrost vents, for example. The delivery section is configured to deliver the air originating from the mixing section to any combination of the vents based on the operating mode selected by a passenger of the vehicle. Each operating mode includes a preselected percentage (or distribution ratio) of the air originating from the mixing section delivered to each of the corresponding vents associated with the selected operating mode. Doors disposed within the delivery section may be actuated to control the distribution of the air to each of the desired vents by blocking or opening various passageways disposed within the delivery section. For example, a "panel operating mode" may include the air distributed only to the panel vents and the console vents, a "defrost operating mode" may include the air distributed only to the windshield defrost vents and the side window defrost vents, and a "floor operating mode" may include the air distributed to each of the front floor vents, the rear floor vents, the windshield defrost vents, and the side window defrost vents.

One problem associated with the distribution of the air to each of the vents of the delivery section relates to differences in a volumetric flow rate and a pressure of the air required at the outlet of each of the vents to achieve the desired distribution of the air for each of the operating modes. Because each of the vents of the delivery section receive air from the mixing section wherein the air has a common pressure value, each portion of the delivery section fluidly coupling the mixing section to a corresponding vent must be constructed or otherwise controlled to cause a desired pressure drop in the air to meet the desired conditions at the outlet of each of the vents. One method of controlling the pressure drop is to variably restrict or open one or more flow paths through which the air passes for a given operating mode. The variable restriction or opening of the flow paths may be achieved by actuating one or more doors disposed within the flow paths to control the pressure and flow rate of the air through each of the flow paths.

The problem associated with the control of the flow of the air through each independent flow path is especially evident when attempting to control the pressure of the air associated with the outlets of the windshield defrost vents and the outlets of the side window defrost vents. It is common for the flow path leading to the windshield defrost vents and the flow path leading to the side window defrost vents to branch from a common portion of the delivery section due to these vents commonly being used together during various operating modes of the air handling system. For example, the flow path leading to the windshield defrost vents and the flow path leading to the side window defrost vents may each branch from a defrost chamber of the delivery section separated from the mixing section by an actuated door. Upon opening the door, air from the mixing section flows into the defrost chamber before branching to one or both of the windshield defrost vents and the side window defrost vents. In certain operating modes of the air handling system, a pressure required at the outlet of each of the windshield defrost vents to achieve a desired volumetric flow rate of the air through the windshield defrost vents may differ in comparison to a pressure required at the outlet of each of the side window defrost vents to achieve a desired volumetric flow rate of the air through each of the side window defrost vents. For example, when operating in the floor operating mode, the windshield defrost vents may require a duct pressure of about 5 PA to deliver the air out of the windshield defrost vents at a volumetric flow rate of about 30-40 m³/h whereas the side window defrost vents may require a duct pressure of about 175 PA to deliver the air out of the side window defrost vents at the same volumetric flow rate of about 30-40 m³/h. In contrast, when operating in the defrost operating mode, the windshield defrost vents and the side window defrost vents may each require approximately the same duct pressure of about 225 PA to deliver the air out of the windshield defrost vents and the side window defrost vents at their required volumetric flow rates of about 250-325 m³/h and 35-45 m³/h, respectively. The potential difference in pressure required at each of the respective vent outlets accordingly frustrates an attempt to control the pressure within each independent flow path by actuating the door disposed upstream of the defrost chamber as an attempt to control the pressure in one of the flow paths may adversely affect the ability to control the pressure in the other of the flow paths.

This problem is further evident in view of changing demands in the distribution of the air to the various vents of the passenger compartment based on the corresponding operating mode, and especially changing demands to the percentage of the air delivered to the side window defrost vents during the floor operating mode, the defrost operating mode, and a mixed floor/defrost operating mode. For example, in traditional air handling systems the floor operating mode may include about 75% of the air delivered to the floor vents, about 17% of the air delivered to the windshield defrost vents, and about 8% of the air delivered to the side window defrost vents. The traditional mixed floor/defrost operating mode may include about 56% of the air delivered to the floor vents, about 34% of the air delivered to the windshield defrost vents, and about 10% of the air delivered to the side window defrost vents. The traditional defrost operating mode may include none of the air delivered to the floor vents, about 80% of the air delivered to the windshield defrost vents, and about 20% of the air delivered to the side window defrost vents.

In contrast, newer air distribution requirements require the distribution of the air to the side window defrost vents to be elevated while also remaining substantially constant throughout the different operating modes utilizing the side window defrost vents. For example, the new requirements for air distribution during the floor operating mode may include about 72% of the air delivered to the floor vents, about 10% of the air delivered to the windshield defrost vents, and about 18% of the air delivered to the side window defrost vents. The new requirements for the mixed floor/defrost operating mode may include about 56% of the air delivered to the floor vents, about 30% of the air delivered to the windshield defrost vents, and about 14% of the air delivered to the side window defrost vents. The new requirements for the defrost operating mode may include none of the air delivered to the floor vents, about 80% of the air delivered to the windshield defrost vents, and about 20% of the air delivered to the side window defrost vents. Accordingly, in contrast to the traditional requirements wherein the percentage and/or airflow volume of the air distributed to the side window defrost vents more than doubled between the floor operating mode and the defrost mode, the new requirements include the percentage and/or air flow volume of the air distributed to the side window defrost vents remaining substantially constant throughout all three of the operating modes including a defrost function. This relationship presents a situation wherein the pressure at the outlets of the side window defrost vents must remain substantially constant for all three operating modes whereas the pressure at the outlets of the windshield defrost vents must vary significantly depending on the selected operating mode.

One solution to the differing pressure requirements between the windshield defrost vents and the side window defrost vents is to provide a separate door for controlling entry into each flow path branching from the defrost chamber. However, this solution may require the addition of multiple components such as doors, actuators, links, or control elements, thereby increasing a cost and complexity to manufacture the air handling system.

The change of the distribution of the air to the windshield defrost vents and the side window defrost vents also poses additional problems relating to the noise, vibration, and harshness (NVH) generated by the flow of the air while flowing through the delivery section. The windshield defrost vents and the side window defrost vents may typically require a relatively small percentage of the air from the mixing section distributed thereto for various operating modes. These conditions may result in a situation where the air delivered to either of the windshield defrost vents or the side window defrost vents must travel through a relatively small and relatively uncontrolled gap while passing from a high pressure chamber (the mixing section) to a relatively low pressure chamber (the defrost chamber of the delivery section), thereby resulting in a rapid expansion of the air in a manner that may cause unwanted NVH.

A control and minimization of NVH is particularly desired in the floor operating mode. In the floor operating mode, air is delivered to the windshield defrost vents in a bleed condition through the relatively small gaps, as mentioned hereinabove. In the prior art, the relatively small gaps are fixed orifices in or adjacent to the door allowing the air to travel therethrough to the windshield defrost vents. However, the problem with the orifices is there is no way to close or completely seal the defrost chamber in the delivery section from the air flowing from the mixing section without additional components such as an extra door, for example. Another known solution has been to open the door in the defrost chamber minimally in order to achieve the relatively small gap. However, the problem with this solution is distribution of the air flowing through the defrost chamber is difficult to control and generates increased undesired NVH. With the newer air distribution requirements, especially when the floor operating mode is selected, it is especially desired to manage air flow through the delivery section to achieve desired resistance control along the path of the air distributed to the windshield defrost vents while minimizing resistance along the flow path of the air distributed to the side window defrost vents.

Accordingly, there exists a need in the art to efficiently and cost effectively control a distribution of air to the windshield defrost vents and the side window defrost vents of an air handling system while preventing an incidence of noise, vibration, and harshness.

SUMMARY OF THE INVENTION

Concordant and consistent with the present invention, a structure and method of efficiently and cost effectively controlling a distribution of air to the windshield defrost vents and the side window defrost vents of an air handling system while preventing an incidence of noise, vibration, and harshness has surprisingly been discovered.

In one embodiment of the invention, an air handling system for a heating, ventilation, and air conditioning system of a motor vehicle having a passenger compartment is disclosed. The air handling system includes a control door rotatably disposed in the conduit. The control door selectively rotates between a first position and a second position. The first position blocks passage of the air flowing through the conduit. The second position blocks passage of the air flowing through a first portion of the conduit and allows the air to flow through a second portion of the conduit. A control feature is disposed in the second portion of the conduit to control at least one of a volumetric flow rate and a pressure of the air flowing through the second portion.

In another embodiment of the invention, an air handling system for a heating, ventilation, and air conditioning system of a motor vehicle having a passenger compartment is disclosed. An air handling system for a heating, ventilation, and air conditioning system of a motor vehicle includes a housing divided into an inlet section, a mixing and conditioning section, and a delivery section. The inlet section delivering air to the mixing and conditioning section. The mixing and conditioning section controlling a temperature of the air flowing there through. The delivery section includes a first conduit configured to deliver the air from the mixing and conditioning section to a first vent of a passenger compartment of the motor vehicle. A control door is rotatably disposed in the first conduit. The control door selectively rotates between a first position to block passage of the air flowing through the first conduit and a second position to allow the air to flow through the first conduit through a bleed path. A control feature is disposed in the first conduit. The control door engages the control feature in the second position to define the bleed path. The control feature controls at least one of a pressure and a volumetric flow rate of the air flowing through the bleed path.

In yet another embodiment of the invention, a method of operating an air handling system of a vehicle having a mixing and conditioning section for receiving air there through and a delivery section for distributing the air to vents of a passenger compartment of the vehicle is disclosed. The method included the step of providing a conduit downstream of the mixing and conditioning section with respect to a direction of the air flowing through the mixing and conditioning section. The conduit having a control door rotatably disposed therein and a control feature disposed therein. The method further includes selectively adjusting the control door to rotate between a first position to block passage of the air flowing through the first conduit and a second position to block passage of the air flowing through a first portion of the first conduit and allow the air to flow through a second portion of the first conduit. The control door engaging the control feature. The control door cooperating with the control feature to direct the air to flow through the second portion. The method also includes controlling at least one of a volumetric flow rate and a pressure of the air flowing through the second portion of the first conduit with the control feature.

BRIEF DESCRIPTION OF THE DRAWINGS

The above, as well as other advantages of the present disclosure, will become readily apparent to those skilled in the art from the following detailed description, particularly when considered in the light of the drawings described hereinafter.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
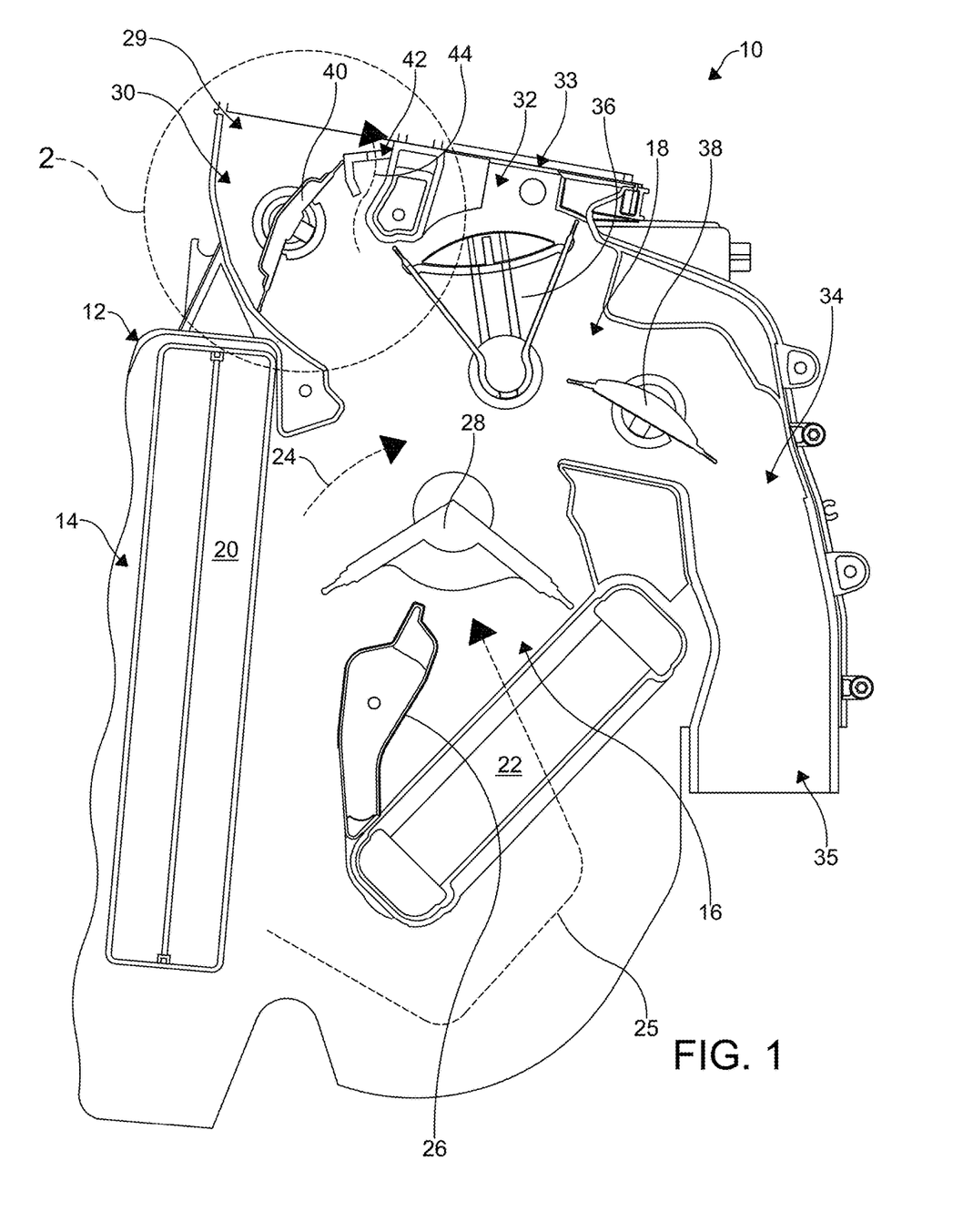
FIG. 1 is a cross-sectional right-side elevational view of an air handling system of a heating, ventilating, and air conditioning system for a vehicle according to an embodiment of the disclosure, wherein the air handling system is in a floor vent operating mode position.

FIG. 1 illustrates an air-handling system 10 of a heating, ventilating, and air conditioning (HVAC) system or climate control system for a vehicle (not shown) according to an embodiment of the disclosure. As used herein, the term air can refer to fluid in a gaseous state, fluid in a liquid state, or any combination thereof. The air-handling system 10 typically provides heating, ventilation, and air conditioning for a passenger compartment (not shown) of the vehicle.

The air-handling system 10 includes a hollow main housing 12. The housing 12 may be formed by the cooperation of a pair of housing shells (not shown). The housing shells may interface with each other along peripheral regions thereof to form the hollow main housing 12. The main housing 12 may be formed from plastic, but other materials can be used, as desired. In other embodiments, the main housing 12 may be formed by the cooperation of three or more separately formed components or housing portions, as desired.

The main housing 12 includes an inlet section 14, a mixing and conditioning section 16, and a delivery section 18. The inlet section 14 receives a supply of air and may include a blower or fan (not shown) for causing the supply of the air to flow to the mixing and conditioning section 16. The supply of the air can be provided from outside of the vehicle, recirculated from the passenger compartment of the vehicle, or a mixture of the two, for example. If desired, a filter (not shown) can be provided upstream or downstream of the inlet section 14 to filter out debris or contaminants carried by the supply of air.

The mixing and conditioning section 16 may include an evaporator core 20, a heater core 22, and a temperature door 28 disposed therein. The evaporator core 20 and the heater core 22 are in communication with a source of cooled fluid (not shown) and a source of heated fluid (not shown) respectively. The evaporator core 20 may form a portion of a primary refrigerant circuit of the air conditioning system associated with the air handling system 10. The evaporator core 20 is configured to exchange heat energy between the air flowing through the housing 12 and the cooled fluid flowing through the evaporator core 20 to cool and/or dehumidify the air. Although described as an evaporator core, it should be understood that any form of cooling device in heat exchange relationship with any device or system of the motor vehicle may be employed for use with the air handling system 10 without departing from the scope of the present invention. The heater core 22 may form a radiator associated with a coolant circuit used to cool an engine of the motor vehicle. The heater core 22 is further configured to exchange heat energy between the air flowing through the housing 12 and a coolant circulated through the coolant circuit to heat the air. Alternatively, the heater core 22 may be in heat exchange relationship with a fluid used to cool a battery or other heat producing device associated with the motor vehicle or the heater core 22 may be a heating device configured to produce heat using an electrical source. It should be understood that any form of heating device suitable for heating a flow of air therethrough may be used in place of the heater core 22 without departing from the scope of the present invention.

The evaporator core 20 may be disposed at an inlet region of the mixing and conditioning section 16 immediately downstream of the inlet section 14. The evaporator core 20 extends across an entirety of a flow area at the inlet region of the mixing and conditioning section 16 to cause the entirety of the air flowing to the mixing and conditioning section 16 to pass through the evaporator core 20, thereby cooling and/or dehumidifying the entirety of the air from the inlet section 14 when entering the mixing and conditioning section 16.

After flowing through the evaporator core 20, the flow of the air encounters a baffle wall 26. A cold air passageway 24 is formed to one side of the baffle wall 26 and a warm air passageway 25 is formed to a second side of the baffle wall 26. The warm air passageway 25 includes the heater core 22 disposed therein. The heater core 22 may be disposed across an entirety of a flow area of the warm air passageway 25, as desired. In other embodiments, only a portion of the flow area of the warm air passageway 25 is covered by the heater core 22, as desired.

The temperature door 28 is rotatably coupled to the main housing 12 at a downstream end of each of the cold air passageway 24 and the warm air passageway 25. The temperature door 28 may be positioned in a first position (not shown) wherein the temperature door 28 is rotated to block passage of the air flowing through the warm air passageway 25. When the temperature door 28 is in the first position the entirety of the air flowing from the inlet section 14 is directed through the opened cold air passageway 24 immediately after flowing through the evaporator core 20. The temperature door 28 may alternatively be positioned in a second position (not shown) wherein the temperature door 28 is rotated to block passage of the air flowing through the cold air passageway 24. When the temperature door 28 is in the second position, the entirety of the air is directed through the opened warm air passageway 25 immediately after flowing through the heater core 22. The temperature door 28 may alternatively be rotated to an intermediate position between the first position and the second position, as shown in FIG. 1. When in the intermediate position, a first partial air flow of the air flowing from the inlet section 14 may flow through the cold air passageway 24, past the temperature door 28, while a second partial air flow of the air flowing from the inlet section 14 may flow through the warm air passageway 25 including passing through the heater core 22, past the temperature door 28, and into the mixing and conditioning section 16. The first partial air flow and the second partial air flow of the air flowing through the mixing and conditioning section 16 from the inlet section 14 are then recombined and mixed past the temperature door 28. As should be understood, the temperature door 28 may be adjustable to a variety of intermediate positions to control a percentage of the air flowing through the cold air passageway 24 and the warm air passageway 25, respectively, to control a temperature of the air according to desired temperature settings of a passenger within the passenger compartment of the motor vehicle.

The delivery section 18 of the main housing 12 includes a first conduit 30, a second conduit 32, and a third conduit 34. The first conduit 30 fluidly couples the mixing and conditioning section 16 to one or more windshield defrost vents (not shown) through one or more windshield defrost vent opening 29 and one or more side window defrost vents (not shown) through side window defrost vent openings 31 (shown in FIG. 4). The second conduit 32 fluidly couples the mixing and conditioning section 16 to one or more panel vents (not shown) and/or one or more console vents (not shown) through one or more panel/console vent openings 33. The third conduit 34 fluidly couples the mixing and conditioning section 16 to one or more front floor vents (not shown) and one or more rear floor vents (not shown) through one or more floor vent openings 35.

A first mode door 36 is rotatably coupled to the main housing 12 within the delivery section 18 adjacent the mixing and conditioning section 16. The first mode door 36 may be positioned in a first position wherein the first mode door 36 is rotated to block passage of the air flowing into the second conduit 32, as shown. When in the first position, the air flowing in the delivery section 18 from the mixing and conditioning section 16 is distributed between one or both of the first conduit 30 and the third conduit 34. The first mode door 36 rotated to the first position may correspond to one of a floor operating mode, a defrost operating mode, and a mixed floor/defrost operating mode. The first mode door 36 may alternatively be positioned in a second position (not shown) wherein the first mode door 36 is rotated to block passage of the air flowing into the first conduit 30. When in the second position, the air flowing through the delivery section 18 from the mixing and conditioning section 16 is distributed between one or both of the second conduit 32 and the third conduit 34. The first mode door 36 rotated to the second position may correspond to a panel operating mode or a mixed panel/floor operating mode. As should be understood, the first mode door 36 may be adjustable to a variety of intermediate positions to control a percentage of the air flowing through the first conduit 30, the second conduit 32, and the third conduit 34, respectively, as desired.

A second mode door 38 is rotatably coupled to the main housing 12 within the third conduit 34 of the delivery section 18. The second mode door 38 may be positioned in a first position (not shown) wherein the second mode door 38 is rotated to block passage of the air flowing through the third conduit 34 from the mixing and conditioning section 16. The second mode door 38 rotated to the first position may correspond to one of a defrost operating mode or a panel operating mode, for example. The second mode door 38 may alternatively be positioned in a second position, wherein the second mode door 38 is rotated to allow and direct the air flowing from the mixing and conditioning section 16 to flow into the third conduit 34, as shown. The second mode door 38 rotated to the second position may correspond to one of the floor operating mode, the mixed panel/floor operating mode, and the mixed floor/defrost operating mode. As should be understood, the second mode door 38 may be adjustable to a variety of intermediate positions to control a velocity, pressure, or percentage of the air flowing through the third conduit 34, as desired.

Figure 2A:
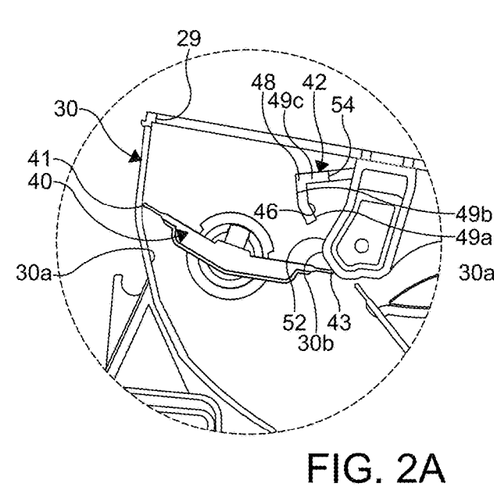
FIG. 2A is an enlarged fragmentary cross-sectional right-side elevational view of the air handling system of FIG. 1 highlighted by circle 2, illustrating a control feature of a first conduit according to an embodiment of the disclosure, wherein a control door of the air handling system is in a first position.
Figure 2B:
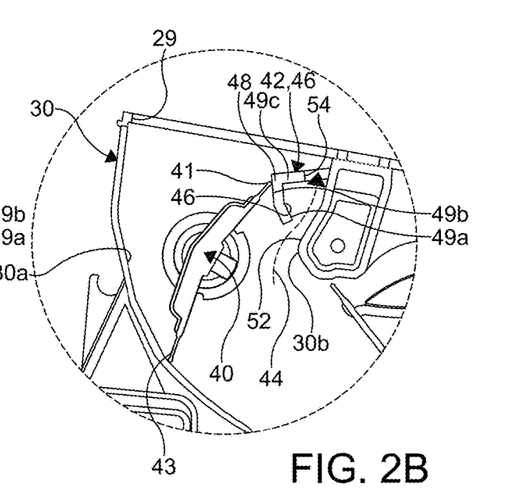
FIG. 2B is an enlarged fragmentary cross-sectional right-side elevational view of a of the air handling system of FIG. 1 highlighted by circle 2, illustrating the control feature of FIG. 2A, wherein the control door of the air handling system is in a bleed position.

A control door 40 is rotatably coupled to the main housing 12 within the first conduit 30 of the delivery section 18. The control door 40 may be positioned in a first position, as shown in FIG. 2A, wherein the control door 40 is rotated to block passage of the air flowing through the first conduit 30 from the mixing and conditioning section 16. A first sealing surface 41 of the control door 40 engages a first conduit wall 30a of the first conduit 30 and a second sealing surface 43 of the control door 40 engages a second conduit wall 30b of the first conduit 30. Alternatively, the control door 40 may be positioned in a second position or bleed position, as shown in FIGS. 1 and 2B. The control door 40 rotated to the bleed position blocks passage of the air flowing through a first portion of the first conduit 30. In the bleed position, the control door 40 cooperates with a control feature 42 to define a second portion or a bleed path 44 in the first conduit 30 to allow or direct the air flowing from the mixing and conditioning section 16 to flow through the first conduit 30 through the bleed path 44. The bleed path 44 is formed adjacent the second conduit wall 30b but may be formed on the first conduit wall 30a, if desired, or other portions of the first conduit 30. The bleed path 44 is configured to provide a minimized continuous flow of air through the first conduit 30 when the control door 40 is in the bleed position. In the bleed position of the control door 40, the first sealing surface 41 of the control door 40 engages the control feature 42 and the second sealing surface 43 engages the first conduit wall 30a of the first conduit 30. The control door 40 rotated to the bleed position may correspond to the floor operating mode. It is understood, the control door 40 may be positioned in an intermediate position between the first position and the bleed position to allow the air to flow through both the first portion of the first conduit 30 and the bleed path 44.

For illustrative purposes only, the disclosure of the application will refer to the air-handling system 10 configuration shown in FIG. 1, wherein the first mode door 36 is positioned in the first position to block the passage of the air flowing into the second conduit 32, the second mode door 38 is positioned in the second position to allow and direct the air to flow into the third conduit 34, and the control door 40 is positioned in the bleed position to block passage of the air flowing through the first portion of the first conduit 30 and allow or direct the air to flow through the bleed path 44 of the first conduit 30. The illustrated configuration shown in FIG. 1 corresponds to the floor operating mode for various applications. However, it is understood, the air-handling system 10 can have alternate configurations, sections, conduits, doors, door positions, and other features to control distribution, volumetric flow rate, and pressure of the air flowing through the main housing 12. Additionally, the alternate configurations can correspond to alternate operating modes as desired depending on the application for the air-handling system 10.

The bleed path 44 is defined as a path having a cross-sectional flow area less than a cross-sectional flow area of the first portion of the first conduit 30, wherein a relatively small percentage of the air flowing from the mixing and conditioning section 16 is caused to "bleed" through the bleed path 44. The bleed path 44 controls a distribution, such as a volumetric flow rate and a pressure distribution, of the air flowing amongst the openings 29, 31, 35 of the conduits 30, 34 of the delivery section 18. For example, in the configuration shown in FIG. 1, the air flowing from the mixing and conditioning section 16 is divided to flow through the third conduit 34 and through the bleed path 44 formed in the first conduit 30. The air flowing through the bleed path 44 thereby diverts or minimizes a volumetric flow rate or a pressure of the air flowing solely through the third conduit 34. The control feature 42, which will be described in further detail herein below, facilitates control of the distribution, the volumetric flow rate, and the pressure flowing through the bleed path 44, and thus through the third conduit 34.

In FIG. 2B, the control feature 42 according to an embodiment of the disclosure is shown. The control feature 42 is an expansion chamber 46 formed by a baffling wall 48 and the second conduit wall 30b forming the first conduit 30. The baffling wall 48 is divided into segments 49a, 49b, 49c such as a plurality of line segments as illustrated in FIG. 2B. The segments 49a, 49b, 49c form a substantially unclosed polygonal cross-sectional shape. However, in other embodiments, the segments 49a, 49b, 49c can each be arcuate segments or form a substantially continuous arcuate cross-sectional shape. Additionally, more or fewer than three segments can be contemplated to define the baffling wall 48, if desired. The first segment 49a has an inlet opening 52 formed therein. The inlet opening 52 is configured as an air inlet to receive the air flowing through the bleed path 44 from the mixing and conditioning section 16. The third segment 49c has an outlet aperture 54 formed therein. The outlet aperture 54 is configured as an air outlet to convey the air flowing through the bleed path 44 to the windshield defrost vent opening 29 and to the windshield defrost vents. However, it is understood the inlet opening 52 and the outlet aperture 54 can be formed in any of the segments 49a, 49b, 49c, as desired. Additionally, it is understood the control feature 42 can be formed by a baffling wall 48 and the second conduit wall 30b, if desired.

Figure 3:
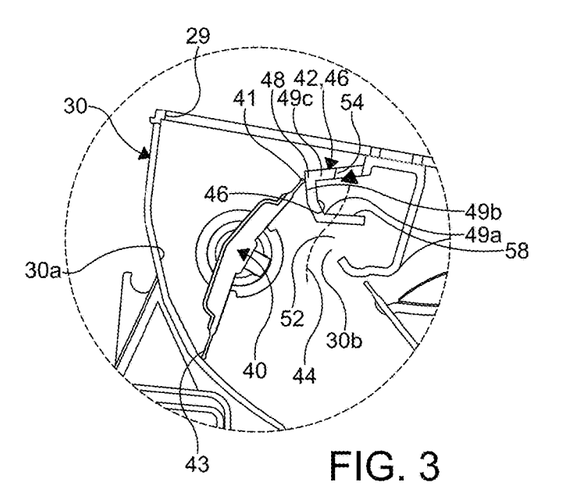
FIG. 3 is an enlarged fragmentary cross-sectional right-side elevational view of the air handling system of FIG. 1 highlighted by circle 2, illustrating a control feature of a first conduit according to another embodiment of the disclosure, wherein a control door of the air handling system is in a bleed position.

FIG. 3 illustrates another example of the expansion chamber 46 according to an embodiment of the disclosure. The expansion chamber 46 has a different configuration and cross-sectional shape from the expansion chamber 46 shown in FIG. 2B. The expansion chamber 46 includes a baffle 58 disposed therein to further minimize a pressure of the air flowing through the bleed path 44. The baffle 58 extends from the baffling wall 48. Additional baffles can be disposed in the expansion chamber 46 as desired to extend from or be spaced from the second conduit wall 30b or the baffling wall 48.

The baffling wall 48 and the second conduit wall 30b of FIGS. 2-3 can be integrally formed with each other and with the housing 12 during a manufacturing process forming the housing 12, for example. However, the baffling wall 48 and the second conduit wall 30b can be separately formed components assembled to the housing 12 during an assembly of the housing 12. Likewise, the baffle 58 of FIG. 3 can also either be integrally formed with or separate components from the baffling wall 48, the second conduit wall 30b, and/or the housing 12, as desired.

Figure 4:
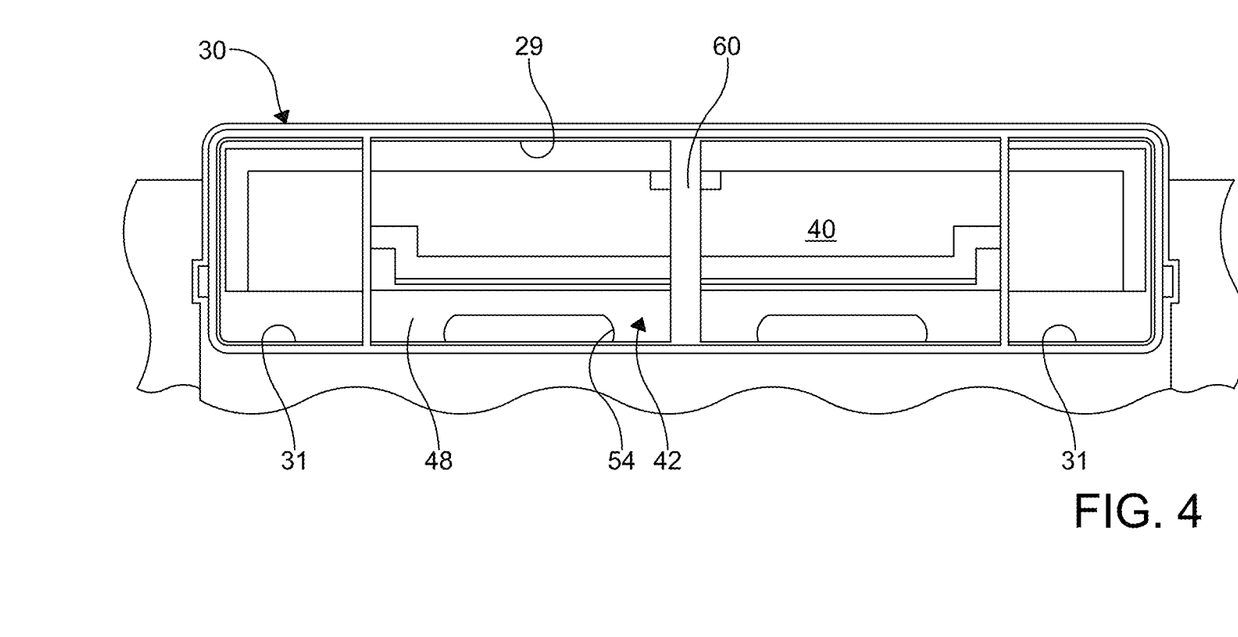
FIG. 4 is a fragmentary top plan view of the first conduit of FIG. 2B-2C, wherein a windshield defrost vent opening and side window defrost openings are shown.

In FIG. 4 a structural arrangement of the windshield defrost vent opening 29 with respect to the side window defrost vent openings 31 is shown. The side window defrost vent openings 31 are laterally disposed adjacent opposing ends of the windshield defrost vent opening 29. The control door 40 is configured to control the flow of the air through the side window defrost vent openings 31. When the control door 40 is in the first position, the control door 40 blocks passage of the air flowing through the side window defrost vent openings 31. When the control door 40 is in the bleed position, as shown, or the intermediate position, the control door 40 allows the air to flow through the side window defrost vent openings 31. In other embodiments, control doors separate from the control door 40 can be employed to control the flow of the air through the side window defrost vent openings 31, if desired.

In the embodiment illustrated, a rib 60 extends between the first conduit wall 30b and the second conduit wall 30b to structurally support the first conduit 30, the control feature 42, and/or other structural components of the air handling system 10, as desired, as well as, divide the opening for coupling to a pair of the windshield defrost vents separated from each other. In other embodiments, more than one of the control doors 40 can be employed for each of the windshield defrost vents, if desired. For example, a pair of the control doors 40 may be disposed in the first conduit 30. A first one of the control doors 40 controls the flow of the air flowing through the windshield defrost vent opening 29 to a first one of the windshield defrost vents and a second one of the control doors 40 controls the flow of the air flowing through the windshield defrost vent opening 29 to a second one of the windshield defrost vents.

As shown, the apertures 54 formed in the control feature 42 are a pair of elongate slots. However, the apertures 54 can have any shape as desired depending on the application and package requirements of the air handling system 10. For example, the apertures 54 can be circular, ovular, polygonal, linear, or any other shape, as desired. Additionally, greater than or fewer than two apertures can be formed in the control feature 42, if desired.

Figure 5:
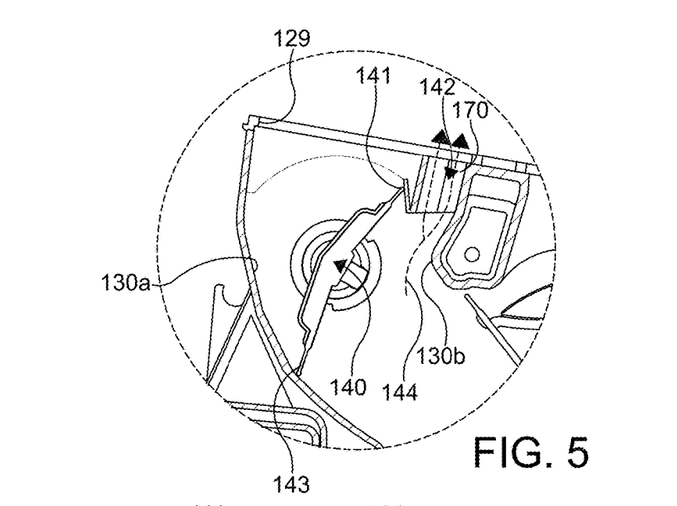
FIG. 5 is an enlarged fragmentary cross-sectional right-side elevational view of a of the air handling system of FIG. 1 highlighted by circle 2, illustrating a control feature of a first conduit according to another embodiment of the disclosure, wherein a control door of the air handling system is in a bleed position.
Figure 6:
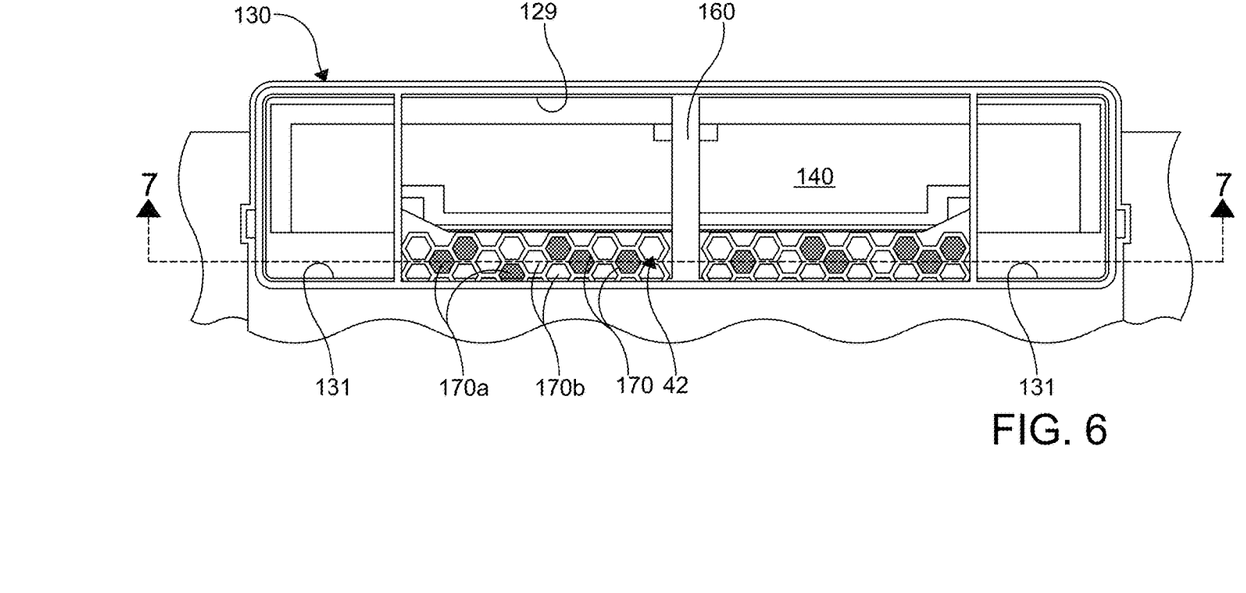
FIG. 6 is a fragmentary top plan view of the first conduit of FIG. 5, wherein a windshield defrost vent opening and side window defrost openings are shown.
Figure 7:
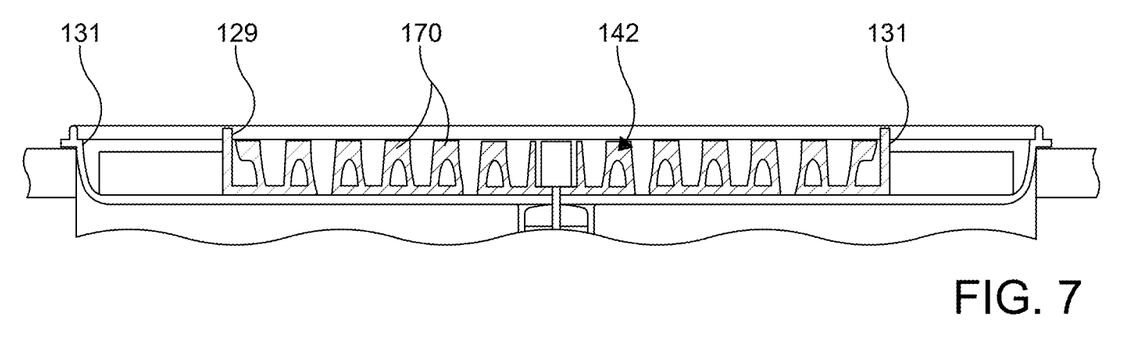
FIG. 7 is a fragmentary cross-sectional view of the first conduit of FIG. 6 taken along the line 7-7.
Figure 8:
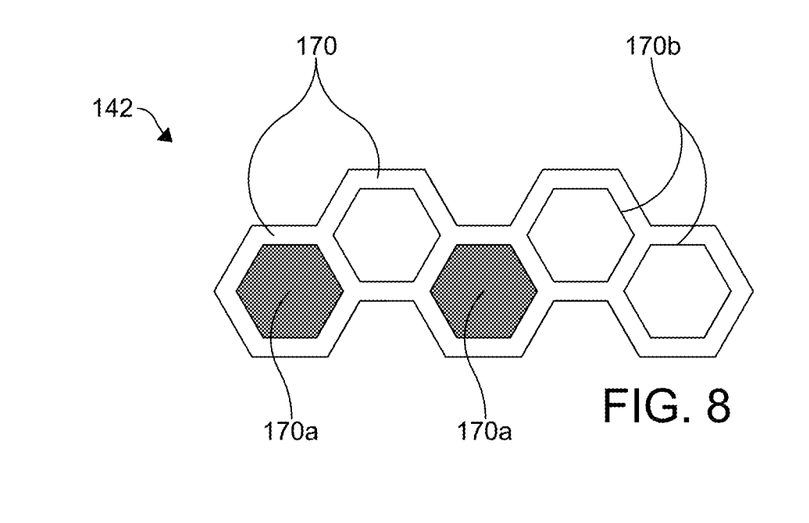
FIG. 8 is a schematic diagram illustrating a pattern of a control feature of the air handling system of FIGS. 5-7.

In FIGS. 5-7, a first conduit 130 configured for the air handling system 110 according to another exemplary embodiment of the invention is illustrated. The air handling system 110 including the first conduit 130 of FIGS. 5-7 includes the same features as the air handling system 10 of illustrated in FIG. 1, except the first conduit 130 is different. Features similar to the air handling system 10 illustrated in FIGS. 1-4 are denoted with the same reference numeral and a preceding number "1" for clarity. The first conduit 130 of FIGS. 5-7 is similar to the first conduit 30 of FIGS. 1-4 described hereinabove, except the control feature 142 has an alternate configuration.

The control feature 142 includes a plurality of columnar cells 170 formed adjacent the second conduit wall 130b to facilitate a minimization of noise, vibration, and harshness (NVH) resulting from air flowing through the bleed path 144. The cells 170 are arranged in a plurality of parallel rows. Alternating ones of the rows are aligned with each other but offset from the cells 170 of adjacent ones of the rows. However, it is understood each of the rows of cells 170 can be aligned with each other, non-parallel with each other, or positioned in any configuration contemplated such as a randomized non-aligning pattern. The cells 170 can be integrally formed with each other and with the housing 112 during a manufacturing process forming the housing 112, for example. However, the cells 170 can be separately formed components assembled to the housing 112 during an assembly of the housing 12.

The cells 170 closed or solids cells 170a and open or hollow cells 170b. The air flowing through the bleed path 144 flows through the hollow cells 170b. The solid cells 170a block passage of the air flowing through the bleed path 144. Any of the cells 170 can be the solid cells 170a or the hollow cells 170b, as desired, depending on the application and package requirements of the air handling system 110, such as distribution, volumetric flow rate, and pressure demands. For example, the solid cells 170a can be positioned in a randomized pattern or repetitive pattern. In another example, the entirety of the cells 170 can be the hollow cells 170b.

Figure 9A:
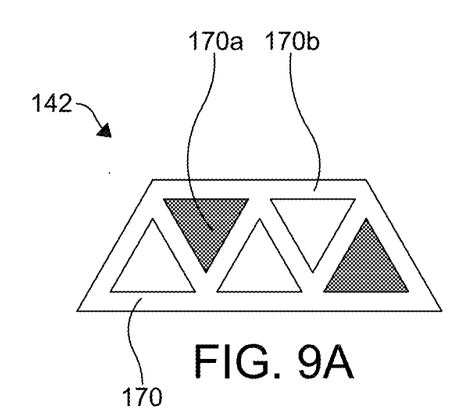
FIG. 9A is a schematic diagram illustrating a pattern of a control feature of the air handling system of FIGS. 5-7 according to another embodiment of the disclosure.
Figure 9B:
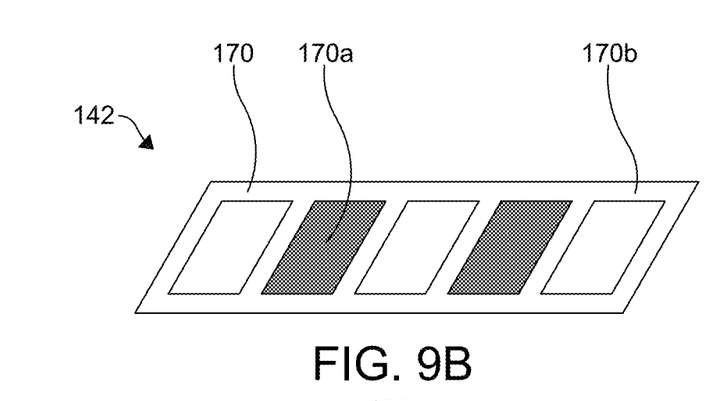
FIG. 9B is a schematic diagram illustrating a pattern of a control feature of the air handling system of FIGS. 5-7 according to another embodiment of the disclosure.
Figure 9C:
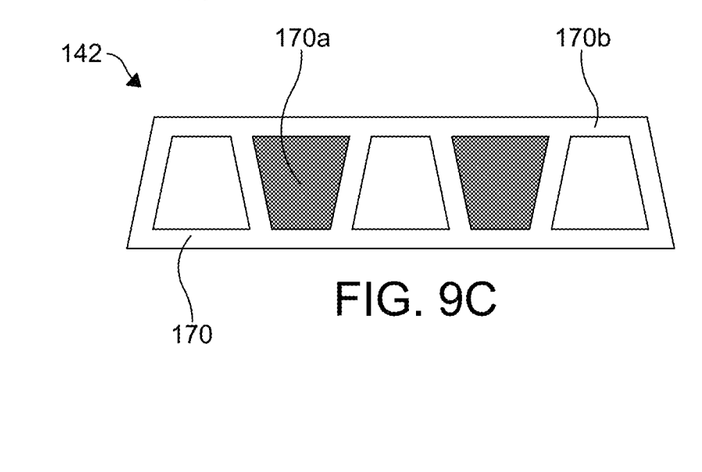
FIG. 9C is a schematic diagram illustrating a pattern of a control feature of the air handling system of FIGS. 5-7 according to another embodiment of the disclosure.
Figure 9D:
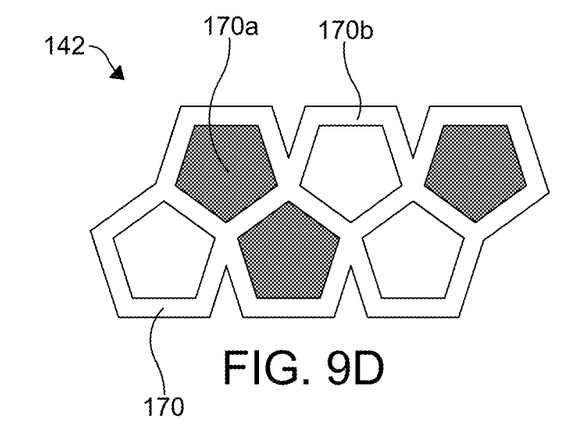
FIG. 9D is a schematic diagram illustrating a pattern of a control feature of the air handling system of FIGS. 5-7 according to another embodiment of the disclosure.

In the exemplary embodiment illustrated in FIGS. 5-8, each of the cells 170 has a substantially hexagonal cross-sectional shape to facilitate a minimization of the NVH resulting from air flowing through the bleed path 144. The cells 170 form a substantially "honeycomb" configuration. However, alternate shapes and patterns can be contemplated. For example, the cells 170 can have a substantially triangular cross-sectional shape as shown in FIG. 9A, a substantially parallelogram cross-sectional shape as shown in FIG. 9B, a substantially trapezoidal cross-sectional shape as shown in FIG. 9C, or a substantially pentagonal cross-sectional shape as shown in FIG. 9D. It is understood the cells 170 can have any cross-sectional shape and can form any configuration as desired. For example, the cells 170 can have a substantially circular or substantially ovular cross-sectional shape. In other examples, the cells 170 can also have a rectangular cross-sectional shape, a substantially octagonal cross-sectional shape, or other cross-sectional shape as desired. Additionally, it is understood the cells 170 can have varying cross-sectional shapes. For example, one or more of the cells 170 can have a triangular cross-sectional shape while the other ones of the cells 170 can have a hexagonal cross-sectional shape. The term "substantially" used in conjunction with the above-mentioned cross-sectional shapes means mostly, but not perfectly, one of the above-mentioned cross-sectional shapes. Furthermore, by the term "substantially" used in conjunction with the above-mentioned cross-sectional shapes, the cells 170 can be configured as semi-cells or partial cells, wherein the cells 170 have an unclosed polygonal cross-sectional shape, an unclosed circular cross-sectional shape, or an unclosed ovular cross-sectional shape, for example.

Figure 10:
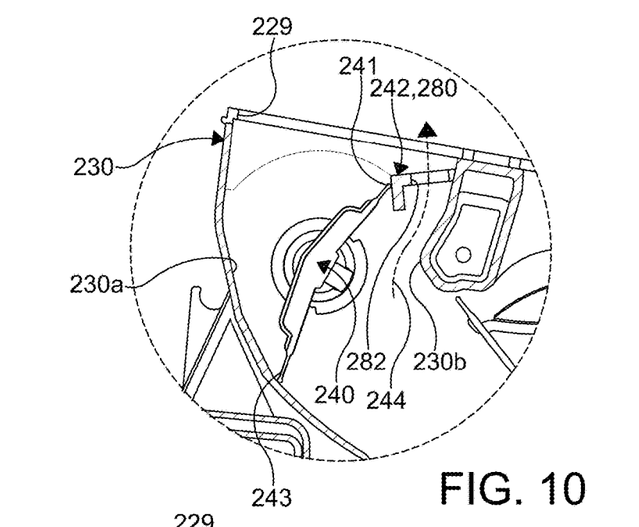
FIG. 10 is an enlarged fragmentary cross-sectional right-side elevational view of a of the air handling system of FIG. 1 highlighted by circle 2, illustrating a control feature of a first conduit according to another embodiment of the disclosure, wherein a control door of the air handling system is in a bleed position.
Figure 11:
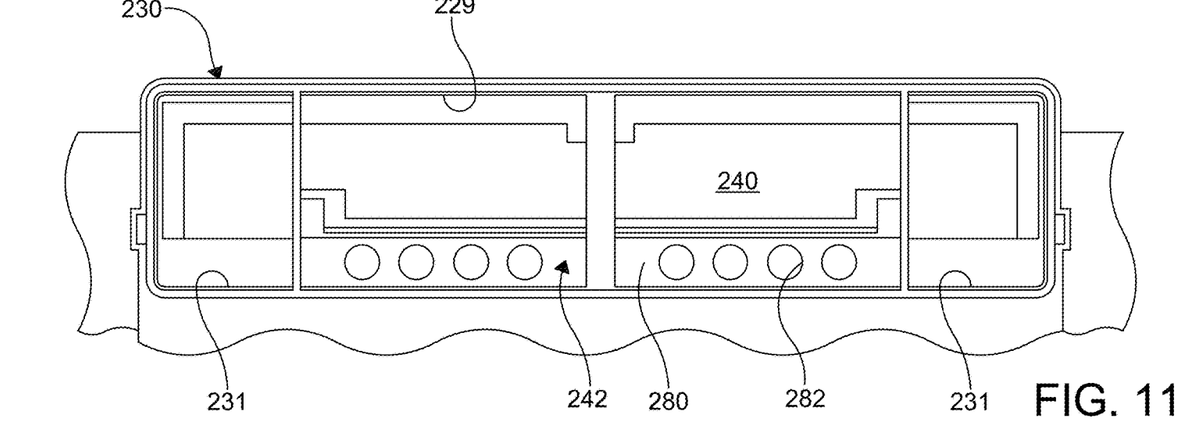
FIG. 11 is a fragmentary top plan view of the first conduit of FIG. 10, wherein a windshield defrost vent opening and side window defrost openings are shown.

In FIGS. 10-11, a first conduit 230 configured for the air handling system 210 according to another exemplary embodiment of the invention is illustrated. The air handling system 210 including the first conduit 230 of FIGS. 10-11 can include substantially the same features as the air handling system 10 illustrated in FIG. 1, except the first conduit 230 is different. Features similar to the air handling system 10 illustrated in FIGS. 1-4 are denoted with the same reference numeral and a preceding number "2" for clarity. The first conduit 230 of FIGS. 10-11 is similar to the first conduit 30 of FIGS. 1-4 described hereinabove, except the control feature 242 has an alternate configuration.

The control feature 242 is a baffle plate 280 extending outwardly from the second conduit wall 230b of the first conduit 230. However, the baffle plate 280 could extend from the first conduit wall 230a, if desired. In certain embodiments, as shown, the baffle plate 280 includes a plurality of aligned apertures 282 formed therein. The air flowing through the bleed path 244 flows through the apertures 282. The apertures 282 are circular in shape. However, in other embodiments, the apertures 282 can have alternate shapes. For example, the apertures 282 can be ovular, triangular, rectangular, polygonal, any other shape, or combinations thereof. Additionally, the apertures 282 can be misaligned, if desired. The alignment and the shape of the apertures 282 depends on the application and package requirements of the air handling system 210. The baffle plate 280 can be integrally formed with the housing 212 during a manufacturing process forming the housing 212, for example. However, the baffle plate 280 can be a separately formed component assembled to the housing 212 during an assembly of the housing 212.

Figure 12:
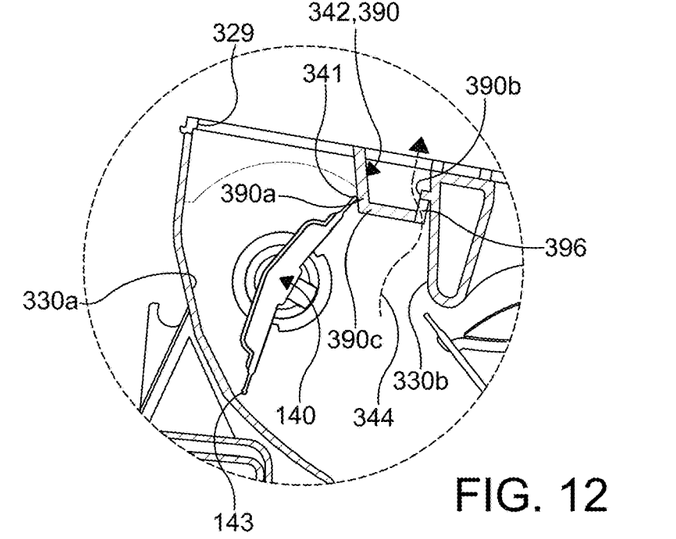
FIG. 12 is an enlarged fragmentary cross-sectional right-side elevational view of a of the air handling system of FIG. 1 highlighted by circle 2, illustrating a control feature of a first conduit according to another embodiment of the disclosure, wherein a control door of the air handling system is in a bleed position.
Figure 13:
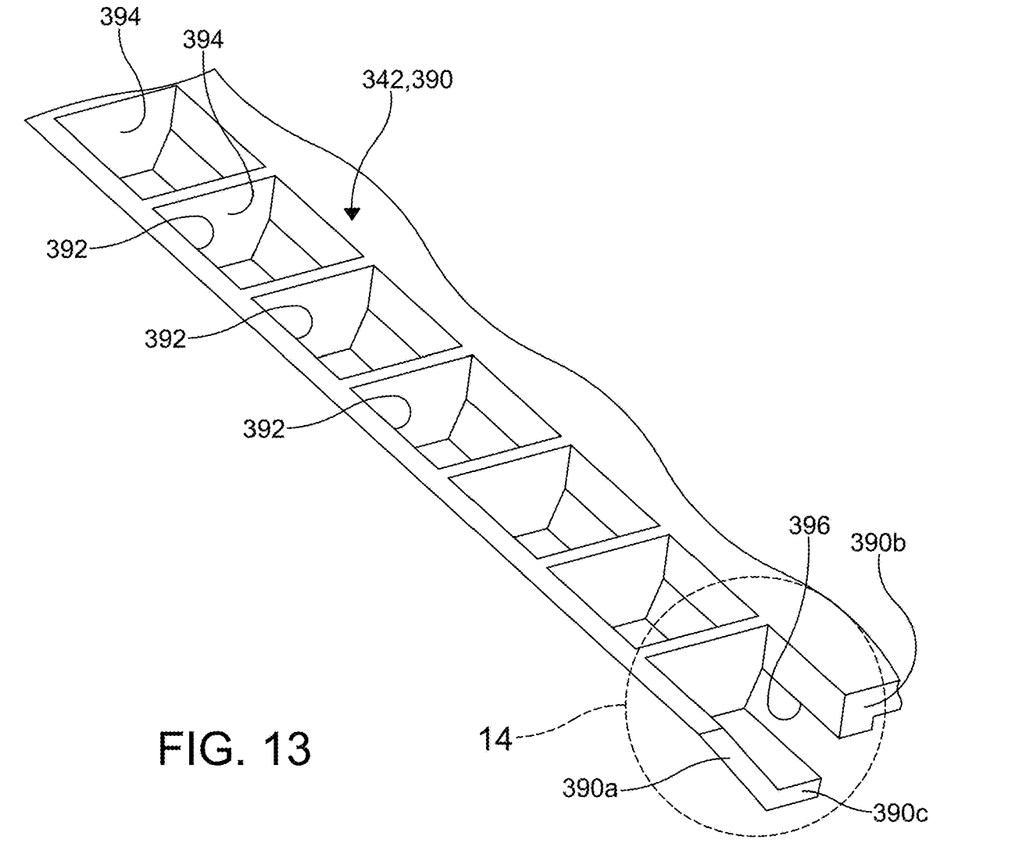
FIG. 13 is a top perspective view of the control feature of FIG. 12.
Figure 14A:
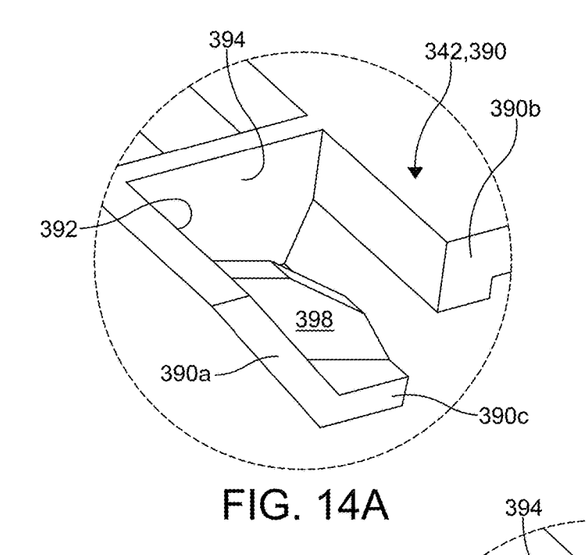
FIG. 14A is an enlarged fragmentary top perspective view of the control feature of FIG. 13, highlighted by circle 14, wherein the control feature includes a secondary control feature according to an embodiment of the disclosure.
Figure 14B:
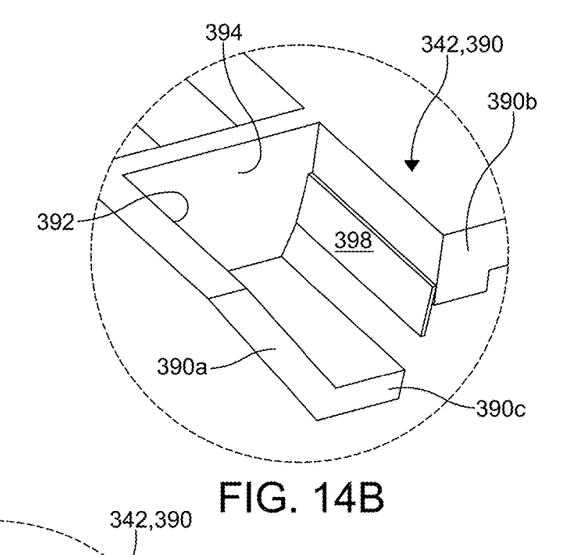
FIG. 14B is an enlarged fragmentary top perspective view of the control feature of FIG. 13, highlighted by circle 14, wherein the control feature includes a secondary control feature according to another embodiment of the disclosure.
Figure 14C:
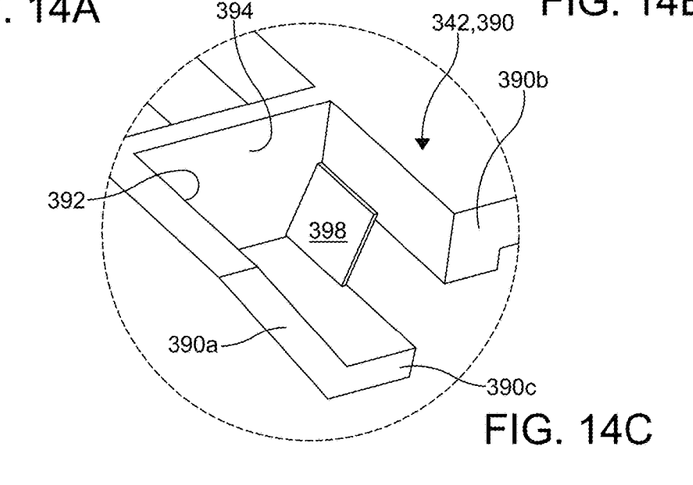
FIG. 14C is an enlarged fragmentary top perspective view of the control feature of FIG. 13, highlighted by circle 14, wherein the control feature includes a secondary control feature according to another embodiment of the disclosure.

In FIGS. 12-14, a first conduit 330 configured for the air handling system 310 according to another exemplary embodiment of the invention is illustrated. The air handling system 310 including the first conduit 330 of FIGS. 12-14 includes the same features as the air handling system 10 illustrated in FIG. 1, except the first conduit 330 is different. Features similar to the air handling system 10 illustrated in FIGS. 1-4 are denoted with the same reference numeral and a preceding number "3" for clarity. The first conduit 330 of FIGS. 12-14 is similar to the first conduit 30 of FIGS. 1-4 described hereinabove, except the control feature 342 has an alternate configuration.

The control feature 342 is a channel 390 disposed adjacent the second conduit wall 330b. Although, the channel 390 can be disposed adjacent the first conduit wall 330a, if desired. The channel 390 is divided into a plurality of compartments 392 configured to receive the air flowing through the bleed path 344 by a plurality of partitions 394. A slot 396 is formed in each of the compartments 392 to receive the air flowing through the bleed path 344 into each of the compartments 392. The channel 390 is formed by a first wall 390a, a second wall 390b, and a third wall 390c extending between the first wall 390a and the second wall 390b of the channel 390. In the illustrated embodiment, the slots 396 are formed in the second wall 390b of the channel 390. However, the slots 396 can be formed in the first wall 390a or the third wall 390b of the channel 390, if desired. The first wall 390a of the channel 390 and/or the second wall 390b can be angled from the third wall 390c of the channel 390 depending on the application and the package requirements of the air handling system 310.

The channel 390 can be integrally formed with the housing 312 during a manufacturing process forming the housing 312, for example. However, the channel 390 can be a separately formed component assembled to the housing 312 during an assembly of the housing 312. The second wall 390b of the channel 390 can be a portion of the second conduit wall 330b of the first conduit 330, if desired.

In certain embodiments, depending on the application of the air handling system 310, secondary control features 398 can be formed in one or more of the compartments 392 of the channel 390. For example, the control feature 398 is a protuberance extending from the first wall 390a of the channel 390 such as shown in FIG. 13A. Although, in alternate embodiments, the protuberance 398 can extend from the second wall 390b or from the partitions 394 if desired. In other examples, the control feature 398 can be a wall extension, such as a plate or piece of material, integrated with or coupled to the second wall 390b to minimize a length of the slot 396, as shown in FIG. 13B, or a width of the slot 396, as shown in FIG. 13C. The control features 398 can be formed on any of the walls 390a, 390b, 390c of the channel 390 as desired to facilitate minimization of NVH and achieve flow distribution characteristics depending on the application package requirements of the air handling system 310.

In application, during the floor operating mode, the first mode door 36, 136, 236, 336 is rotated to the first position and the second mode door 38, 138, 238, 338 is rotated to the second position. Concurrently, the control door 40, 140, 240, 340 rotates to the bleed position, wherein the first sealing surface 41, 141, 241, 341 thereof engages the control feature 42, 142, 242, 342 and the second sealing surface 43, 143, 243, 343 engages the first conduit wall 30a, 130a, 230a, 330a. The air flowing from the mixing and conditioning section 16, 116, 216, 316 is divided to flow towards the third conduit 34, 134, 234, 334 and to the first conduit 30, 130, 230, 330. The air flowing through third conduit 34, 134, 234, 334 is conveyed to the floor vents. The air flowing through the first conduit 30, 130, 230, 330 is conveyed to the side window defrost vent openings 31, 131, 231, 331 and through the bleed path 44, 144, 244, 344. The air flowing through the bleed path 44, 144, 244, 344 is conveyed through the control feature 42, 142, 242, 342, through the windshield defrost vent opening 29, 129, 229, 329 to the windshield defrost vents.

Advantageously, the control feature 42, 142, 242, 342 cooperates with the control door 40, 140, 240, 340 to increase resistance along the bleed path 44, 144, 244, 344 during a floor operating mode while avoiding a minimization of resistance of along the demist path. The control feature 42, 142, 242, 342 controls a flow distribution, volumetric flow rate, and pressure of the air flowing through the bleed path 44, 144, 244, 344 while minimizing undesired NVH.

Accordingly, from the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air handling system for a heating, ventilation, and air conditioning system of a motor vehicle comprising:
a conduit configured to convey air to a vent of the air handling system;
a control door rotatably disposed in the conduit between a first conduit wall and a second conduit wall, the control door selectively rotating between a first position and a second position, the first position blocking passage of the air flowing through the conduit and the second position blocking passage of the air flowing through a first portion of the conduit and allowing the air to flow through a bleed path of a second portion of the conduit, wherein a first sealing surface of the control door engages the first conduit wall and a second sealing surface of the control door engages the second conduit wall in the first position; and
a control feature formed in the second portion of the conduit to control at least one of a volumetric flow rate and a pressure of the air flowing through the second portion, wherein the first sealing surface of the control door engages the control feature, and the second sealing surface of the control door engages the first conduit wall in the second position, and wherein the control door is configured to rotate in an intermediate position between the first position and the second position, and wherein in the intermediate position the control door allows the air to flow through the first portion of the conduit and the second portion of the conduit including the bleed path.

2. The air handling system of claim 1, wherein the control feature is an expansion chamber.

3. The air handling system of claim 2, wherein the expansion chamber includes a baffle disposed therein.

4. The air handling system of claim 1, wherein the control feature is a baffle plate with a plurality of apertures formed therethrough.

5. The air handling system of claim 1, wherein the control feature is a channel with a plurality of slots formed therein.

6. The air handling system of claim 5, wherein the channel includes a plurality of compartments formed by a plurality of partitions.

7. The air handling system of claim 6, wherein the channel includes a secondary control feature formed in one of the plurality of compartments.

8. An air handling system for a heating, ventilation, and air conditioning system of a motor vehicle comprising:
a housing divided into an inlet section, a mixing and conditioning section, and a delivery section, the inlet section delivering air to the mixing and conditioning section, the mixing and conditioning section controlling a temperature of the air flowing therethrough, and the delivery section including a first conduit configured to deliver the air from the mixing and conditioning section to a first vent of a passenger compartment of the motor vehicle;
a control door rotatably disposed in the first conduit, the control door selectively rotating between a first position to block passage of the air flowing through an entirety of the first conduit and a second position to allow the air to flow through the first conduit through a bleed path, wherein a first sealing surface of the control door engages a first conduit wall and a second sealing surface of the control door engages a second conduit wall in the first position; and
a control feature disposed in the first conduit, the control door engaging the control feature in the second position to define the bleed path, the control feature controlling at least one of a pressure and a volumetric flow rate of the air flowing through the bleed path, wherein the first sealing surface of the control door engages the control feature and the second sealing surface of the control door engages the first conduit wall in the second position, wherein the door control door is configured to rotate to an intermediate position between the first position and the second position, and wherein in the intermediate position the control door allows the air to flow through a first portion of the conduit and a second portion of the conduit including the bleed path, and wherein a flow area of the bleed path increases in a direction from an inlet of the bleed path to an outlet of the bleed path.

9. The air handling system of claim 8, wherein the delivery section includes a second conduit configured to deliver the air from the mixing and conditioning section to a second vent of the passenger compartment, a third conduit configured to deliver the air from the mixing and conditioning section to a third vent of the passenger compartment, a first mode door, and a second mode door, the first mode door selectively controlling the air flowing through the first conduit and the second conduit, the third mode door selectively controlling the air flowing through the third conduit.

10. The air handling system of claim 9, wherein the first vent is a windshield defrost vent, the second vent is a panel vent, and the third vent is a floor vent.

11. The air handling system of claim 8, wherein the second position of the control door corresponds to a floor operating mode of the air handling system.

12. The air handling system of claim 8, wherein the control feature is one of an expansion chamber, a plurality of columnar cells, a baffle plate, and a channel.

13. The air handling system of claim 8, wherein the control feature is adjacent the second conduit wall defining the first conduit.

14. The air handling system of claim 8, wherein the first conduit conveys the air to a windshield defrost vent opening and a pair of side window defrost vent openings.

15. A method of operating an air handling system of a vehicle having a mixing and conditioning section for conveying air therethrough and a delivery section for distributing the air to vents of a passenger compartment of the vehicle, the method comprising the steps of:
providing a conduit downstream of the mixing and conditioning section with respect to a direction of a flow of the air through the mixing and conditioning section, the conduit having a control door rotatably disposed therein and a control feature disposed therein;
selectively adjusting the control door to rotate between a first position to block passage of the air flowing through an entirety of the conduit, a second position to block passage of the air flowing through a first portion of the conduit and allow the air to flow through only a bleed path formed in a second portion of the conduit, and an intermediate position between the first position and the second position to allow the air to flow through the first portion and the second portion including the bleed path wherein a first sealing surface of the control door engages a first conduit wall and a second sealing surface of the control door engages a second conduit wall in the first position, and the first sealing surface of the control door engages the control feature and the second sealing surface of the control door engages the first conduit wall in the second position, the control door cooperating with the control feature to direct the air to flow through the second portion; and controlling at least one of a volumetric flow rate and a pressure of the air flowing through the second portion of the conduit with the control feature, and wherein a flow area of the bleed path increases in a direction from an inlet of bleed path to an outlet of the bleed path.

16. The method of claim 15, further comprising the step of adjusting the control door to the second position during a floor operating mode.

17. The method of claim 15, wherein the control feature is one of an expansion chamber, a baffle plate, and a channel.

\* \* \* \* \*